United States Patent

Weichmann et al.

[11] Patent Number: 5,558,709
[45] Date of Patent: Sep. 24, 1996

[54] FLOW IMPROVING AGENTS FOR BINDER SUSPENSIONS CONTAINING CEMENT

[75] Inventors: Josef Weichmann, Pleiskirchen; Aloisia Stadler, Tacherting; Alfred Kern, Kirchweidach, all of Germany

[73] Assignee: SKW Trostberg, Trostberg, Germany

[21] Appl. No.: 517,818

[22] Filed: Aug. 22, 1995

[30] Foreign Application Priority Data

Aug. 26, 1994 [DE] Germany ............... 44 30 362.9

[51] Int. Cl.$^6$ ............... C04B 24/00; C04B 24/22
[52] U.S. Cl. ............... 106/727; 106/808; 106/823; 524/6; 524/25; 524/597; 528/254; 528/258; 528/265
[58] Field of Search ............... 106/727, 808, 106/823, 138, 148, 147; 524/597, 3, 6, 25; 528/254, 258, 265

[56] References Cited

U.S. PATENT DOCUMENTS

| | | | |
|---|---|---|---|
| 3,856,542 | 12/1974 | Aignesberger et al. | 524/6 |
| 4,009,135 | 2/1977 | Harreus et al. | 524/3 |
| 4,272,430 | 6/1981 | Pieh et al. | 524/4 |
| 4,430,469 | 2/1984 | Burge et al. | 524/247 |
| 4,501,839 | 2/1985 | Burge et al. | 524/247 |
| 4,872,885 | 10/1989 | Tsubakimoto et al. | 524/599 |
| 5,071,945 | 12/1991 | Weichmann et al. | 524/598 |

*Primary Examiner*—Anthony Green
*Attorney, Agent, or Firm*—Felfe & Lynch

[57] ABSTRACT

Disclosed is a flow improving agent for binder suspensions containing cement which is composed of a) amino-s-triazine-formaldehyde-sulfite condensation products having a molar ratio of amino-s-triazine:formaldehyde:sulfite of 1:1.3 to 6.0: 0.3 to 1.5 and a low content of free formaldehye as well as b) casein. The flow improving agents have the advantage that the flowability is considerably improved compared to casein (alone) for example and the increased flowability remains constant even over a longer time period.

15 Claims, No Drawings

FLOW IMPROVING AGENTS FOR BINDER SUSPENSIONS CONTAINING CEMENT

BACKGROUND OF THE INVENTION

The invention relates to flow improving agents for binder suspensions containing cement based on sulfite-modified amino-s-triazine-formaldehyde condensation products and casein and it also relates to their use for producing self-levelling smoothing compositions.

The use of sulfite-modified amino-s-triazine-formaldehyde condensation products as flow improving agents in the processing of dry mortar mixtures, pourable mortars and other cement-bonded building materials is known.

Melamine is mainly used in this connection as the amino-s-triazine which is why these flow improving agents are known as MFS resins in the trade. They cause a strong liquefaction of the mortar mixture without undesired side effects occurring in the processing or in the functional properties of the hardened building material.

It is well known that commercially available flow improving agents based on melamine-formaldehyde-sulfite (e.g. Melment F 10® from the SKW Trostberg AG Company) produce an excellent liquefying effect even at very low dosages of about 0.3 to 1.2% by weight relative to the weight of cement.

The liquefying effect is achieved without lowering the surface tension of the water in the binder system which is usually the case for example with sulfonated naphthalene-formaldehyde condensation products (NFS resins) or flow improving agents with a surfactant-like polymer structure. The advantage of MFS resins is presumed to be due to the fact that no air voids are introduced into the mortar during the mixing process and the mortar density and strength are not adversely affected after hardening.

In addition MFS resins provide the fresh mortar mixture with a good cohesive strength so that even when the flow properties are extreme separation phenomena do not occur.

This phenomenon also called segregation, is feared especially in the production of self-flowing smoothing compositions (e.g. in the case of self-levelling screeds) since it leads to a non-uniform layer structure of the screed due to floating of the fine material and sedimentation of the coarse grain.

The result is strains within the material with a risk of stress cracking as well as an unfavourable time-course of drying due to the formation of a particularly dense and thus water-impermeable layer of fine material at the surface.

However, a disadvantage of MFS flow improving agents is that, despite the high initial efficacy, the flowing effect decreases relatively rapidly. Thus when used in smoothing compositions undesired variations in the flow property of the mortar occur within the technically applicable time periods.

In contrast it is known that casein as a mortar additive causes the so-called "self-healing" phenomenon.

"Self-healing" is understood to mean that a mortar to which casein has been added is still capable of smoothing out surface faults or flaws of cast mortar caused by processing which may be present even after a very long standing period by means of a very slow interflowing before hardening.

This "self-healing" can at present only be achieved with casein but not with conventional flow improving agents.

Therefore there have been many attempts to synergistically combine the properties of flow improving agents based on melamine with those of casein in self-levelling binder suspensions.

However, in doing so it has turned out that flow improving agents based on known amino-s-triazine-formaldehyde-sulfites cannot be combined with casein and that the simultaneous use of these resins and casein leads to a deterioration of the flow properties compared to the single mixtures.

The object of the present invention is therefore to develop flow improving agents which do not have the said disadvantages of the state of the art but which instead can be used in self-levelling smoothing compositions with good technical application properties.

THE INVENTION

The object of the invention is achieved according to the invention by providing flow improving agents composed of a) amino-s-triazine-formaldehyde-sulfite condensation products having a molar ratio of amino-s-triazine:formaldehyde:sulfite of 1:1.3 to 6.0:0.3 to 1.5 and a low content of free formaldehyde as well as b) casein.

Surprisingly it has turned out that amino-s-triazine-formaldehyde-sulfite condensation products of this composition can be combined with casein without problems when they have a low content of free formaldehyde.

In this way it is possible to formulate self-levelling smoothing compositions based on inorganic binders which have all the technical application advantages that are introduced by amino-s-triazine flow improving agents and which are at the same time capable of "self-healing" as caused by casein.

The flow improving agents of the invention are composed of two components a) and b). Component a) is an amino-s-triazine-formaldehyde-sulfite condensation product which is characterized on the one hand by a particular molar ratio of its components and on the other hand by a low free formaldehyde content. The molar ratio of amino-s-triazine:formaldehyde:sulfite is 1:1.3 to 6.0:0.3 to 1.5 according to the invention and preferably 1:2.0 to 3.0:0.8 to 1.3. Melamine is preferred as the amino-s-triazine. However, guanamines such as e.g. benzoguanamine or acetoguanamine are also very well suited. It is also possible within the scope of the invention to replace up to 50 mole % of the amino-s-triazines by one or several other aminoplast formers such as e.g. urea, thiourea, dicyandiamide or guanidine (salts).

In order to modify the condensation products used according to the invention, the usual sulfite derivatives are used as compounds introducing sulfonic acid groups, the alkali and alkaline-earth sulfites being generally preferred. However, bisulfites or pyrosulfites are also suitable.

According to a preferred embodiment, the condensation product (component a) is used in the form of an aqueous solution with a solids content of 25 to 55% by weight as occurs during production and can be combined in this form with component b) (casein). The condensation product (component a) is preferably used in a solid form for example after spray drying.

The viscosity of the liquid condensation products used according to the invention can be varied within wide limits; however, it has proven to be particularly advantageous to use such condensation products which have a viscosity of 4 to 1000 mm$^2$/s at 80° C. during production.

It is essential for the invention that the condensation products have a low free formaldehyde content which is preferably <0.1% by weight and particularly preferably <0.01% by weight. Only when these amino-s-triazine-formaldehyde-sulfite condensation products have a low content of free formaldehyde, as defined above, is it possible to combine them without difficulty with casein.

The condensation products used according to the invention (component a) and their synthesis are known from the European Patent Application EP 0 336 165 A1.

The flow improving agents according to the invention contain casein as the second important component b) for the invention wherein the known commercial types can be used in particular.

The weight ratio of component a) (condensation products) to component b) (casein) can be varied within wide limits. This ratio is preferably adjusted to 10:1 to 1:10.

The flow improving agents according to the invention are excellently suitable as additives for all binder suspensions containing cement such as mortar, concrete, cement slurries etc. due to their good liquefying action. The agents according to the invention have proven to be particularly advantageous for applications in liquefying self-levelling smoothing compositions such as e.g. flow screeds where their good compatibility with casein has a particularly positive effect. In this case the flow improving agents are added in an amount of 0.01 to 10% by weight, preferably 0.1 to 5% by weight relative to the cement content of the respective inorganic binder suspensions. Apart from the binders (cement, lime hydrate) these may also contain aggregates (sand, gravel) or filling materials (calcium carbonate, quartz sand) as well as additives in the form of solidification retarders, accelerators, expanding agents, film-forming polymer dispersions, hydrophobizing agents or thickeners.

In this connection the flow improving agents according to the invention have the advantage for example compared to casein (alone) that flowability is considerably improved and the increased flowability is maintained over a longer time period.

The following examples are intended to illustrate the invention in more detail.

EXAMPLE 1 (production)

A condensation product with the following molar ratio is produced:

| M | F | SO$_3$ |
|---|---|--------|
| 1 | 2.0 | 1.0 |

M = melamine
F = formaldehyde
SO$_3$ = sulfite

Preparation:

252 g melamine is added to 400 g formalin (30%) and 247 g water at pH 8.0 to 8.5 and adjusted to pH 11.9 with 41 g NaOH (20%).

Subsequently 190 g sodium pyrosulfite is added while heating at the same time to 70° to 80° C.

If no more sulfite can be detected, it is adjusted to pH 5.5 with 224 g sulphuric acid (10%) and the reaction mixture is condensed further at 80° C. until the final viscosity of 6 mm$^2$/s (at 80° C.) is reached.

Subsequently it is after-treated at 80° C. for 5 minutes in a strong alkaline medium using 60 g NaOH (20%) (pH 11.3) before cooling the product.

Properties:

Solids content: 40.1% by weight free formaldehyde content: <0.01%

EXAMPLE 2 (application)

The example elucidates the liquefying effect and the ability to readily combine a MFS condensation product (component a) according to the invention produced according to example 1 in a mixture with a commercial casein (Havero 120 mesh) as component b).

A combination with a commercial flow improving agent based on MFS (Melment L 10® from the SKW Trostberg AG) is also shown as a comparison which has a free formaldehyde content of 0.3% by weight.

The following mixture was selected as the self-levelling smoothing composition:

| | |
|---|---|
| Quartz sand H33 | 200 g |
| Portland cement PZ 45 F (Blautal) | 175 g |
| lime hydrate [Ca(OH)$_2$] | 125 g |
| trisodium citrate | 0.2 g |
| mixing water | 100 g |

The production and testing of the floor smoothing composition is carried out according to the method described by L. M. Meyer and W. F. Perenchio in "Concrete International" (1979, vol. 1, p. 36) in which the floor smoothing composition is subjected to a so-called "mini-slump test" and in this way the liquefying action of an additive is assessed.

In order to carry out the tests, the floor smoothing compositions were stirred to a homogeneous suspension in which the mixing water and the additive were added first.

The dry mortar mixture was sprinkled in within 30 seconds and it was allowed to slump for a further 30 seconds. Subsequently it was stirred with a hand stirrer at level I and level II for one minute in each case.

After determining the flow mass, the mixture was again returned to the stirring vessel. Before testing again after 15 minutes in each case it was again stirred for one minute at level II.

The liquefying effect was tested in a time-dependent manner for 30 minutes at intervals of 15 minutes in each case.

Only the time course realistically reflects the behaviour of a self-levelling smoothing composition under installation conditions in which the interval from the time of mixing ($a_0$) up to 30 minutes ($a_{30}$) in particular has the greatest significance.

The results are summarized in Table 1.

TABLE 1

| Experiment No. | Flow improving agent [dosage][1] | Casein [dosage][1] | Flow measurement in [cm] | | |
|---|---|---|---|---|---|
| | | | $a_0$ | $a_{15}$ | $a_{30}$ |
| 1 | — | Havero [0.2] | 21.4 | 8.5 | 8.5 |
| 2 | Melment L 10 ® [0.2] | — | 24.6 | 19.7 | 16.4 |
| 3 | Melment L 10 ® [0.2] | Havero [0.2] | 11.7 | 15.9 | 10.8 |
| 4 | MFS resin according to example 1 [0.2] | — | 22.5 | 15.1 | 11.5 |
| 5 | MFS resin according to example 1 [0.2] | Havero [0.2] | 18.6 | 24.7 | 23.1 |

[1] The dosage in each case was in % by weight of the flow improving agent or casein (calculated as a solid) relative to the total smoothing composition.

The table shows in experiment 5 that the inventive combination of flow improving agents leads to a prolonged continuous good flowing of the smoothing composition over 30 minutes, the flow improving agent and casein acting synergistically.

In contrast when casein and a conventional MFS flow improving agent (Melment L 10® from SKW Trostberg AG) are used simultaneously a substantial decrease of the flow measurements already occurs at time point $a_0$ as shown by the comparative experiments 1 to 4 and also leads to a rapid loss of the dispersing effect even after 30 minutes.

EXAMPLE 3 (application example)

The example shows the liquefying effect of mixtures of a commercial casein (Havero 120 mesh) and a MFS condensation product according to the invention (according to example 1) in a self-levelling polymer-treated smoothing composition.

The combination of casein with a commercial MFS condensation product (Melment L 10®, SKW Trostberg AG) is also listed for comparison (Table 2).

The following mixture was selected as the self-levelling floor smoothing composition:

|  | % by weight |
|---|---|
| Calcium carbonate 70 µm: | 5.0 |
| defoamer Agitan P 800: | 0.1 |
| lime hydrate: | 3.0 |
| methylcellulose 100 to 300 cps: | 0.1 |
| Portland cement PZ 45 F: | 35.0 |
| quartz powder 40 µm: | 7.0 |
| quartz sand 0.1 to 0.3 mm: | 38.0 |
| aluminous cement: | 7.0 |
| trisodium citrate: | 0.3 |
| Vinnapas ® dispersion powder RE 523 Z: | 4.0 |
| casein/MFS condensation product: | 0.5 |
|  | 100.0 |

| | mixing water 24% by weight | | | | | |
|---|---|---|---|---|---|---|
| Mixing ratio casein : MFS conden- | MFS resin according to example 1 flow measurement in [cm] | | | Melment L 10 ® | | |
| sation product | $a_0$ | $a_{15}$ | $a_{30}$ | $a_0$ | $a_{15}$ | $a_{30}$ |
| 80 : 20 | 23.9 | 23.2 | 22.9 | 20.1 | 19.7 | 19.8 |
| 50 : 50 | 23.3 | 23.0 | 22.0 | 17.7 | 18.8 | 18.8 |

The total dosage of liquefier in each case was 0.5% by weight relative to the total mass. The blank value of the flow measurement (without addition of liquefier) is 16.2 cm.

The example shows that the resins used according to the invention are highly compatible with casein even in complexely composed formulations made of several different cements and in a re-dispersible polymer dispersion.

This is reflected by the uniform time course of the flow action over 30 minutes. In contrast there is a rapid decrease in the dispersing action with conventional MFS condensation products (Melment L 10®) in particular at higher dosages (50/50 mixture).

It will be understood that the specification and examples are illustrative but not limitative of the present invention and that other embodiments within the spirit and scope of the invention will suggest themselves to those skilled in the art.

We claim:

1. A flow improving agent for binder suspensions containing cement comprising:

a) an amino-s-triazine-formaldehyde-sulfite condensation product having a molar ratio of amino-s-triazine: formaldehyde:sulfite of 1:1.3 to 6.0:0.3 to 1.5 with a free formaldehyde content of up to 0.1% by weight; and
   b) casein, wherein the weight ratio of the condensation product to casein is 10:1 to 1:10.

2. The flow improving agent of claim 1 wherein the amino-s-triazine is melamine.

3. The flow improving agent of claim 1 wherein the molar ratio of amino-s-triazine:formaldehyde:sulfite is 1:2.0 to 3.0:0.8 to 1.3.

4. The flow improving agent of claim 1 wherein the condensation product is an aqueous solution having a solids content of 25 to 55% by weight.

5. The flow improving agent of claim 1 wherein the condensation product is in a solid form.

6. The flow improving agent of claim 1 wherein the condensation product has a viscosity of 4 to 1000 mm²/s at 80° C.

7. The flow improving agent of claim 1 wherein the free formaldehyde content is <0.01% by weight.

8. The flow improving agent of claim 1 wherein the amino-s-triazine is at least one of benzoguanimine or acetoguanamine.

9. A method of improving self-levelling smoothing properties of a cement-bonded flow screed having a cement content comprising: adding to the screed a flow improving agent of claim 1 in an amount of 0.01 to 10% by weight relative to the cement content.

10. The method of claim 9, wherein the flow improving agent is used in an amount of 0.1 to 5% by weight relative to the cement content.

11. A process for improving the self-levelling properties of a binder suspension containing cement, comprising: adding to the suspension the flow improving agent of claim 1 in an amount of 0.01 to 10% by weight relative to the cement content of the suspension.

12. A self-levelling smoothing composition comprising: a cement-containing binder suspension; 0.01 to 10% by weight, relative to the cement content, of a flow improving agent said flow improving agent comprising (a) a condensation product with a molar ratio of amino-s-triazine:formaldehyde:sulfite of 1:1.3 to 6.0:0.3 to 1.5; free formaldehyde in an amount of up to 0.1% by weight; and (b) casein in a weight ratio of 10:1 to 1:10 relative to the condensation product.

13. The self-levelling smoothing composition of claim 12 wherein the amino-s-triazine is melamine.

14. The self-levelling smooth composition of claim 12 wherein the molar ratio of amino-s-triazine:formaldehyde:sulfite is 1:2.0 to 3.0:0.8 to 1.3 triazine:formaldehyde:sulfite.

15. The self-levelling smoothing composition of claim 12 wherein the free formaldehyde content is 0.01% by weight.

* * * * *